United States Patent
Glueck (10) Patent No.: US 11,510,762 B2
(45) Date of Patent: Nov. 29, 2022

(54) SHELL FOR ADAPTING A RETENTION ELEMENT AND METHOD FOR THE SAME

(71) Applicant: bredent GmbH & Co. KG, Senden (DE)

(72) Inventor: Olaf Glueck, Pfaffenhofen (DE)

(73) Assignee: Bredent GmbH & Co. KG, Senden (DE)

( * ) Notice: Subject to any disclaimer, the term of this patent is extended or adjusted under 35 U.S.C. 154(b) by 436 days.

(21) Appl. No.: 16/303,768

(22) PCT Filed: Jun. 12, 2017

(86) PCT No.: PCT/EP2017/064224
§ 371 (c)(1),
(2) Date: Nov. 21, 2018

(87) PCT Pub. No.: WO2017/220356
PCT Pub. Date: Dec. 28, 2017

(65) Prior Publication Data
US 2020/0281703 A1  Sep. 10, 2020

(30) Foreign Application Priority Data

Jun. 24, 2016 (DE) .................... 10 2016 111 646.7

(51) Int. Cl.
*A61C 13/00* (2006.01)
*A61C 8/00* (2006.01)
*A61C 13/265* (2006.01)

(52) U.S. Cl.
CPC ........ *A61C 13/0024* (2013.01); *A61C 8/0013* (2013.01); *A61C 8/0016* (2013.01);
(Continued)

(58) Field of Classification Search
CPC . A61C 13/265; A61C 13/2656; A61C 8/0048; A61C 8/0057; A61C 8/0062; A61C 8/008; A61F 2002/3435; A61F 2002/3448
(Continued)

(56) References Cited

U.S. PATENT DOCUMENTS 4,044,403 A * 8/1977 D'Errico .................... A61F 2/32
623/22.17
4,044,467 A * 8/1977 Linkow ................ A61C 8/0048
433/176
(Continued)

FOREIGN PATENT DOCUMENTS

DE    199 01 529 A1    8/2000
GB    2 119 258 A    11/1983
(Continued)

OTHER PUBLICATIONS

International Search Report of PCT/EP2017/064224, dated Sep. 1, 2017.
(Continued)

*Primary Examiner* — Nicholas D Lucchesi
(74) *Attorney, Agent, or Firm* — Collard & Roe, P.C.

(57) ABSTRACT

In a shell for adapting a retention element to an anchoring element, and a method of forming a further retention element on an anchoring element including a shell, the shell has an internal cavity, the dimensions of which are matched to the external dimensions of the retention element and which is connectable to the retention element in an integral or form-fitting manner, and has an outer surface which is formed as a further retention element.

15 Claims, 4 Drawing Sheets

(52) U.S. Cl.
CPC .......... *A61C 8/0057* (2013.01); *A61C 8/0059* (2013.01); *A61C 8/0062* (2013.01); *A61C 13/2656* (2013.01)

(58) Field of Classification Search
USPC .................................................. 433/173, 174
See application file for complete search history.

(56) References Cited

U.S. PATENT DOCUMENTS

| | | | | |
|---|---|---|---|---|
| 4,062,119 | A * | 12/1977 | Linkow | A61C 8/0048 433/176 |
| 4,416,629 | A * | 11/1983 | Mozsary | A61C 8/0022 433/173 |
| 4,822,369 | A * | 4/1989 | Oueveau | A61F 2/34 623/22.14 |
| 5,194,000 | A | 3/1993 | Dury | |
| 5,211,561 | A * | 5/1993 | Graub | A61C 8/0086 433/169 |
| 5,520,540 | A * | 5/1996 | Nardi | A61C 8/0048 433/172 |
| 5,658,338 | A * | 8/1997 | Tullos | A61B 17/7098 623/22.39 |
| 5,755,807 | A * | 5/1998 | Anstaett | A61F 2/32 623/22.2 |
| 5,993,211 | A * | 11/1999 | Broberg | A61C 8/0001 433/172 |
| 6,981,871 | B2 * | 1/2006 | Mullaly | A61C 8/0048 433/172 |
| 9,204,943 | B1 * | 12/2015 | Zadeh | A61K 6/20 |
| 9,314,318 | B2 * | 4/2016 | Mullaly | A61C 8/0096 |
| 9,883,926 | B2 * | 2/2018 | Haralampopoulos | A61C 13/08 |
| 9,907,629 | B2 * | 3/2018 | Boehm | A61C 8/0062 |
| 2003/0181987 | A1 * | 9/2003 | Muirhead-Allwood | A61F 2/32 623/22.15 |
| 2006/0269903 | A1 | 11/2006 | Bulard et al. | |
| 2007/0111163 | A1 * | 5/2007 | Powell | A61C 13/0001 433/173 |
| 2009/0029320 | A1 * | 1/2009 | Auderset | A61C 13/2653 433/182 |
| 2011/0282460 | A1 * | 11/2011 | Holtmann | A61F 2/34 623/22.24 |
| 2012/0185059 | A1 * | 7/2012 | Vankoski | A61F 2/4684 623/22.24 |
| 2016/0317261 | A1 * | 11/2016 | Schnitzspan | A61C 13/1003 |
| 2019/0029778 | A1 * | 1/2019 | Miller | A61C 8/0012 |
| 2019/0239989 | A1 * | 8/2019 | Boehm | A61C 8/0062 |

FOREIGN PATENT DOCUMENTS

| | | |
|---|---|---|
| KR | 10-1625167 B1 | 5/2016 |
| WO | 90/01303 A2 | 2/1990 |

OTHER PUBLICATIONS

Anonymous: "Universal Abutment System," Bicon Dental Implants, Mar. 23, 2016, XP002772884 Retrieved from the Internet on Nov. 2, 2018, total of 3 pages URL: https://web.archive.org/web/20160323142804/http://www.bicon.com/downloads/pdf/Bicon_UN_Brochure.pdf.

* cited by examiner

SHELL FOR ADAPTING A RETENTION ELEMENT AND METHOD FOR THE SAME

CROSS REFERENCE TO RELATED APPLICATIONS

This application is the National Stage of PCT/EP2017/064224 filed on Jun. 12, 2017, which claims priority under 35 U.S.C. § 119 of German Application No. 10 2016 111 646.7 filed on Jun. 24, 2016, the disclosures of which are incorporated by reference. The international application under PCT article 21(2) was not published in English.

BACKGROUND OF THE INVENTION

1. Field of the Invention

The invention relates to a shell for adaptation of a retention element on an anchoring element. Furthermore, a method for formation of a further retention element on an anchoring element, using a shell, is described.

2. Description of the Related Art

Implants or root pins, as they are used when a tooth or entire parts of the masticatory apparatus needs/need to be replaced, have retention elements to fix a dental prosthesis or a rail in place, which elements project out of the jaw and gums of the patient. Frequently, the retention elements are ball-shaped. These are called ball heads and are also referred to as patrices, and dental prostheses, which possess a cavity that matches the ball head, are set onto them. The portion of the dental prosthesis that faces the patrices is frequently referred to as a matrix. The cavity in the prosthesis is frequently lined with an elastic material, which ensures sufficient adhesion friction between the ball head and the prosthesis. The possibility therefore exists for the patient or the dentist to remove the dental prosthesis for the purpose of adjustment or cleaning.

A known device for releasably connecting prosthesis parts with formations on the top of implants or root pins is known, for example, from the document DE 199 01 529 A1 also filed by the applicant.

In practical use, however, it has been shown that the diameter of the formation on the top of implants or root pins decreases over time, and thereby the adhesive friction between implant and prosthesis or between root pin and prosthesis decreases. Studies in this regard have shown that the cause for the decrease in diameter is successive wear of the metal surface by micro-solids. These micro-solids are formed by means of the introduction of saliva or tiny amounts of food pulp into the interior of the prosthesis, where the food pulp or the saliva crystallizes over time. When the prosthesis is set on or pulled off, the surface of the retention element is worn away due to these crystals.

After some time, the hold of the prosthesis on the retention element decreases to such an extent that it is necessary, in order to restore the wearing comfort of the patient, but also in order to prevent the prosthesis from unintentionally coming loose, to renew the retention element. The common method in practice, so as to restore the radius, provides that the retention element, which has a ball shape, for example, is radially reduced to a cylinder, on which an outside thread is subsequently cut, so that a new ball, which is provided with a matching inside thread, can be screwed on. Analogously, this method also takes place in the case of non-ball-shaped dimensions.

This method is comparatively time-consuming and leads to significant discomfort and inconvenience for the patient. This discomfort and inconvenience is all the greater, the more rotation elements in the mouth of the patient need to be renewed. Furthermore, this common method for restoration of the retention element can frequently be used only once, and this has the result of replacement of the root pin or of the implant in the case of renewed wear. In this connection, it is obvious that replacement of implants and root pins brings with it the greatest possible discomfort and inconvenience for the patient, and therefore should be avoided.

In order to increase treatment comfort, and to keep the treatment period and the work effort of dental personnel as low as possible, but also to reduce the material expenditure, it is therefore desirable to overcome the disadvantages that occur.

SUMMARY OF THE INVENTION

It is therefore the task of the invention to create a shell or to indicate a method for the formation of a further retention element on an anchoring element, using a shell, which can be applied to and fixed in place on a retention element of an implant or root pin.

This task is accomplished by means of the characteristics according to the invention. Further advantageous embodiments of the invention are discussed below. These can be combined with one another in technologically practical manner. The description, in particular in connection with the drawing, additionally characterizes and specifies the invention.

According to the invention, a shell for adaptation of a retention element on an anchoring element is indicated, wherein the shell has a cavity that lies on the inside, the dimensions of which are adapted to the outside dimensions of the retention element, and can be connected with the retention element with material fit or shape fit, and has an outer surface that is configured as a further retention element.

Accordingly, a further retention element is formed by means of the shell, which element increases the size of the retention element that already exists. In this regard, the further retention element can be configured, like the original retention element, in the form of a ball, wherein the cavity of the shell that lies on the inside is adapted to the outside dimensions of the original retention element, so that the shell can be placed over the original retention element. In this regard, it is possible to connect the shell with the original retention element either with material fit or also with shape fit. Thereby the invention creates a renewal of a retention element that already exists, by means of a further retention element having outside dimensions that are increased in size, without needing to have recourse to the methods usual in the state of the art for repair of existing retention elements, in this regard. Therefore a sufficient hold on an existing anchoring element can be created in simple manner, even in the case of wear or renewed wear, wherein the shell according to the invention provides easy handling and rapid therapy in the mouth of the patient.

According to one embodiment of the invention, the shell comprises one or more plastics.

By means of the use of plastics, a certain elasticity of the shell according to the invention is achieved, so that application of the shell onto the original retention element is possible. This is particularly relevant for shape-fit attachment of the shell.

According to a further embodiment of the invention, the shell comprises one or more metals.

Metals have shape-stable but also elastic properties. Inert metals and precious metals are particular possibilities for use as a shell in dental technology. Use of the same metal of which the retention element that already exists is made is particularly advantageous, because in this way, redox reactions, which would promote wear and would reduce wearing comfort, are avoided.

According to a further embodiment of the invention, the shell is produced from a hybrid material, which is particularly composed of plastics, ceramics, metals and/or composite materials.

These materials can also be structured to be elastic, if necessary, and furthermore demonstrate the required strength and compatibility in dental technology.

According to a further embodiment of the invention, the plastic or the hybrid material or the metal has a coloration that represents a dimension of the further retention element.

For easy handling, the outside dimensions of the further retention element can be characterized by a corresponding coloration, so that when a dental prosthesis is applied, it can be directly recognized which outside dimension was selected for the further retention element. When specific standard sizes are set for outside dimensions of the further retention element, a modular system can thereby be created, which makes corresponding shells available for different types of outside dimensions. Typical outside dimensions, which have also been used in dental technology up to the present, amount to 1.7 mm, 1.8 mm, or also 2.2 mm and 2.4 mm, for example. However, different systems are in use in this regard, since the final dimensions of the retention elements are frequently individually established by the manufacturer. Therefore compatibility with existing matrices is possible by making different outside dimensions of the shells available, so that the invention can be used on common systems within known and established diameters of retention elements.

According to a further embodiment of the invention, the cavity has an undercut, which holds the shell on the retention element or supports the hold on the retention element.

Shape-fit attachment of the shell on a retention element is supported by an undercut. Within the scope of the invention, however, it is also possible that the shell does not have an undercut and therefore is held on the retention element by means of a material-fit connection.

According to a further embodiment of the invention, the cavity has rotation symmetry along an axial direction.

A cavity with rotation symmetry can be provided both for material-fit connection and for shape-fit connection of the shell on a retention element that already exists.

According to a further embodiment of the invention, the cavity is adapted to the retention element, which has reduced functionality due to wear.

Accordingly, the shell according to the invention is used for repair of a worn retention element, for example of a ball head. The shell forms a further retention element, which has outside dimensions that are correspondingly increased in size, after being attached to the original retention element. This increase in size can also be adapted to different systems of matrices by means of shells having different dimensions. As an example, the existing retention element could originally have been a ball with a diameter of 1.7 mm, which has been worn down to 1.6 mm on the side. By means of the shell according to the invention, an increase in size to 2.2 mm now takes place, and this once again represents a common dimension for matrices. If a change in systems to a different type of matrix were to take place, a shell could also be made available that increases the outside dimension to 2.4 mm, and this once again is also a common outside dimension.

According to a further embodiment of the invention, the cavity is adapted to the retention element so as to expand the diameter of the existing retention element.

In contrast to repair of a worn retention element, here an increase in size of the diameter of a retention element that already exists can take place, so that better holding forces can be achieved. In this regard, the existing retention element can once again be a ball-shaped head of an implant, but it must be selected to be smaller in diameter than the implant diameter, because otherwise the implant cannot be screwed into the bone. Accordingly, the tools for screwing the implant in are needed only a single time, because subsequently, the implant has grown into the bone and thereby the reduced holding force due to the lower ball diameter is not desirable. By means of the shell according to the invention, it is now possible for an increase in the diameter to take place by means of formation of a further retention element, so that now, better retention and greater holding forces can be achieved. In this regard, both a shape-fit connection and a material-fit connection of the shell with the retention element that already exists can take place.

Independent of whether the shell is used for repair of an existing retention element or for increasing the diameter of an existing retention element, the diameter of the further retention element can correspond to a next greater value from a standard product line, so as to create compatibility with different systems of matrices.

According to a further embodiment of the invention, the cavity is dimensioned in such a manner that a free space for adhesive materials remains between the surface of the cavity that lies on the inside and the surface of the retention element. In this regard, the adhesive material can be an adhesive or a cement.

Accordingly, it is possible to connect the shell with the retention element with material fit, wherein the hold on the retention element can also be additionally supported by means of shape fit.

According to a further embodiment of the invention, the retention element is attached to or on implants or root pins.

The shell according to the invention can be used, in particular, in connection with implants or root pins, so as to create a further retention element having an increased diameter.

According to a further embodiment of the invention, the outer surface of the further retention element deviates from a ball shape.

In this regard, the outer surface of the shell that acts as a further retention element can be ball-shaped, but can also have other forms usual in dental technology that have a retentive effect, such as, for example, that of an abutment, so that it is possible to make a switch from a ball head system to a different attachment system for a removable dental prosthesis.

According to the invention, a method for formation of a further retention element on an anchoring element, in particular using a shell as described above, is indicated, wherein the steps of selecting a shell while paying attention to the dimensions of the retention element, setting the shell onto the rotation element, and setting a dental prosthesis onto the shell are carried out.

This method can be used so as to replace the original retention element, the functionality of which has been reduced by wear, or to expand the dimensions of a retention element that has not been worn away.

BRIEF DESCRIPTION OF THE DRAWINGS

In the following, some exemplary embodiments will be explained in greater detail using the drawing. This shows.

DETAILED DESCRIPTION OF THE PREFERRED EMBODIMENTS

In the figures, the same or functionally equivalent elements are provided with the same reference symbols.

Figure 1A:
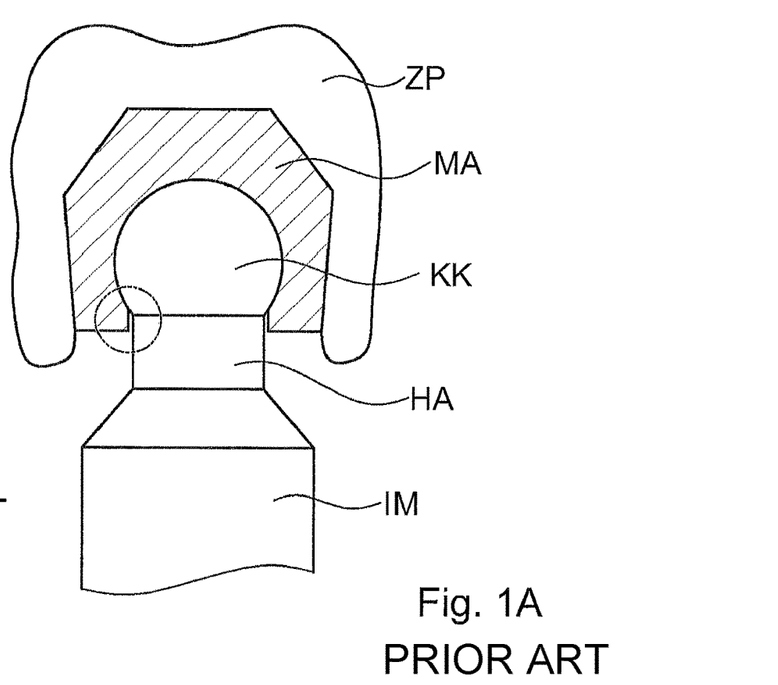
FIG. 1A a known implant having a ball head that has not been worn away, and a dental prosthesis set onto it, in a side view, FIG. 1B a detail view from FIG. 1A, FIG. 2 the implant from FIG. 1 with a worn ball head and a dental prosthesis set onto it, in a side view, FIG. 3A the implant from FIG. 2 with a shell according to the invention in a side view, FIG. 3B a detail view from FIG. 3A, FIG. 4A the implant from FIG. 2 with a further shell according to the invention, in a side view, FIG. 4B a detail view from FIG. 4A, FIG. 5 the implant from FIG. 2 with a further shell according to the invention, in a side view, FIG. 6A the repaired implant from FIG. 3A with a dental prosthesis set onto it, in a side view, FIG. 6B a detail view from FIG. 6A, and FIG. 7 an implant with ball head that is not worn away, and with a shell according to the invention, in a side view.

In FIG. 1A, the upper end of an implant IM, which end is not introduced into a bone of the patient, is shown, together with a dental prosthesis ZP and a matrix MA. The implant IM has a ball head KK at its upper end, as a retention element. The ball head KK serves as a patrix with regard to the matrix MA.

Figure 1B:
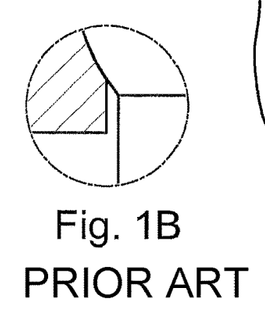

The implant IM shown in FIG. 1A is in a state of no wear, so that no wear locations have yet been formed on the ball head KK. Therefore the matrix MA surrounds the ball head KK partially on its underside that faces a neck HA, and lies against the ball head KK with shape fit and/or material fit. As a result, a holding force occurs between the dental prosthesis ZP lined with the matrix MA and the ball head KK, as becomes clear from the detail representation according to FIG. 1B.

Figure 2:
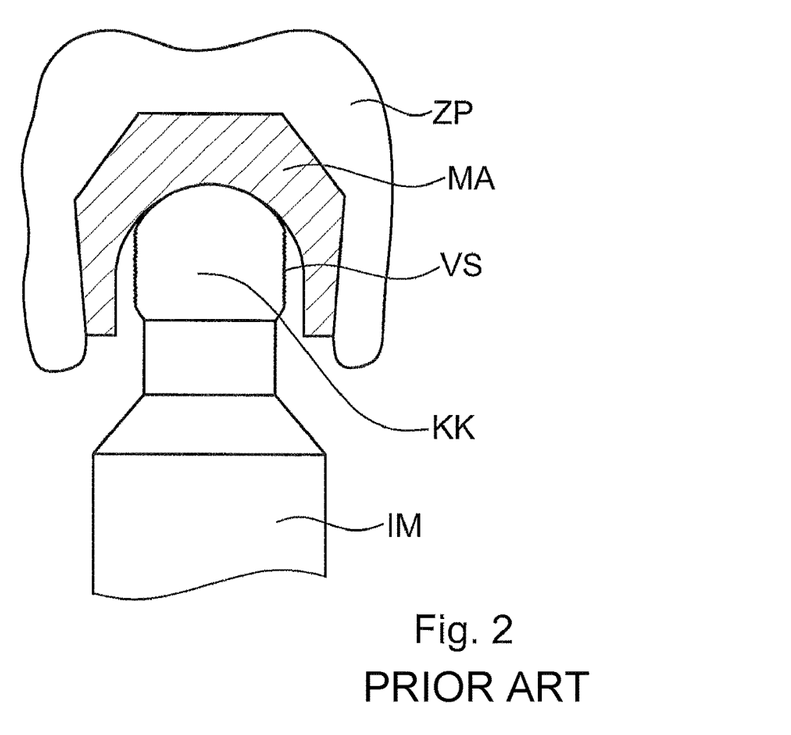

In contrast, in FIG. 2 the implant IM from FIG. 1 is shown with a worn ball head KK. Along wear locations VS of the ball head, a reduction in the holding force takes place, which results from the reduction in the diameter of the ball head KK. The wear does not have to show itself, as shown in FIG. 2, so clearly that there are no contact locations or only contact locations that lie at the top between the ball head KK and the matrix MA. Even a lesser reduction in the diameter of the ball head KK already leads to a reduction in the holding force.

It is true that the wear locations VS from FIG. 2 are characteristic and are caused by affixing and removing the dental prosthesis ZP, but other wear profiles, in particular asymmetrical wear profiles and also wear locations on the top of the ball head can also occur. The holding force is reduced particularly greatly if the matrix MA no longer surrounds the ball head KK on the side that faces the neck HA, as shown in FIG. 2. In comparison with FIG. 1, it becomes clear that a retention element worn in such manner is no longer suitable for holding the dental prosthesis ZP.

Figures 3A, 3B:
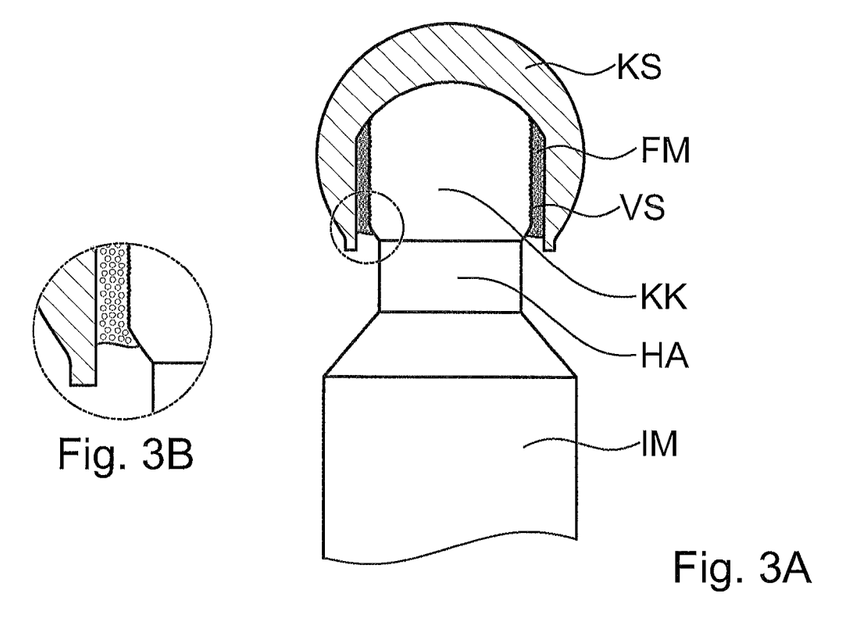

For repair of the ball head KK from FIG. 2, a ball shell KS is now made available, as shown in FIG. 3A, which shell is applied over the worn ball head KK. In this regard, the shell KS has a cavity that lies in the inside, the dimensions of which cavity are adapted to the outside dimensions of the ball head KK in such a manner that a free space for a filler compound FM remains. The filler compound FM serves as an adhesive material and can be made available in the form of an adhesive or a cement, for example. Accordingly, the shell KS can be glued onto the retention element in the form of the ball head KK, so that a material-fit connection is produced. The shell KS then forms the further retention element as a replacement of the retention element in the form of the ball head KK.

In this regard, the cavity can be configured along an axial direction that essentially follows the longitudinal direction of the implant IM, also with rotation symmetry. The ball shell KS can be composed of plastic, metal, veneers made of multiple plastic materials, as well as of ceramic or composite materials. FIG. 3B shows the region between ball shell KS and ball head KK at the lower end once again, in an enlarged representation.

Figures 4A, 4B:
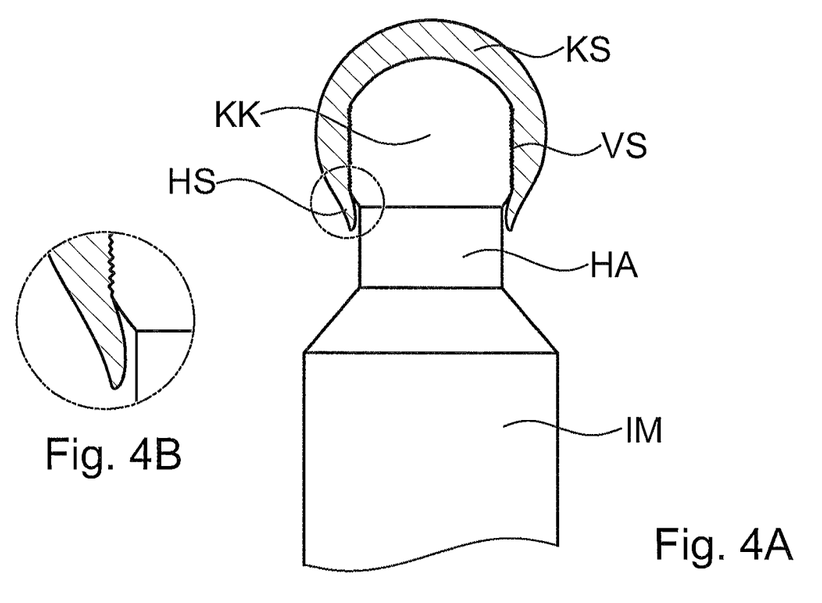

A further possibility for repair of the worn ball head KK from FIG. 2 is shown in FIG. 4A. In this embodiment, a ball shell KS according to the invention having an undercut HS is made available, which shell is set onto the worn ball head KK. The undercut HS surrounds the lower base of the ball head, which remains in spite of wear and faces in the direction of the neck HA, and is thereby mechanically secured to prevent loosening. The ball shell KS can be composed of plastic, metal, veneers made of multiple plastic material, as well as of ceramic or composite materials.

In order to allow the ball shell KS to be set onto the worn ball head KK but nevertheless to guarantee a firm seat, the ball shell KS can be elastic as a whole or at specific locations. Furthermore, the cavity of the ball shell KS, which lies on the inside, can be adapted to the shape of the wear location VS, so that a shape-fit connection occurs between ball shell KS and worn ball head KK, as can be seen in FIG. 4B, in an enlarged representation.

However, in analogy to FIG. 3A, a filler compound FM can also be introduced into the cavity of the ball shell KS, so that the ball shell KS surrounds the ball head KK with material fit along the wear locations VS and/or at other locations at which no shape-fit connection occurs due to differences in shape between cavity and ball head KK. The filler compound FM that is introduced can be made available in the form of an adhesive or a cement, for example.

Figure 5:
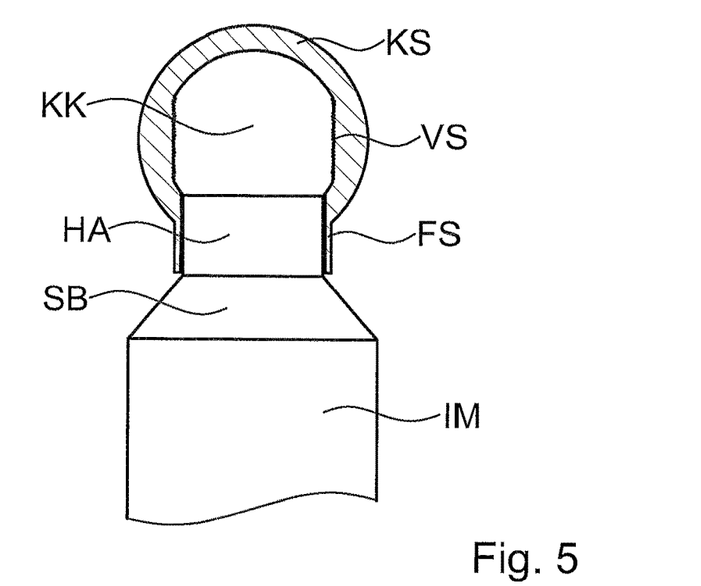

A further possibility for repair of the worn ball head from FIG. 2 is shown in FIG. 5. The ball shell KS with undercut, according to the invention, as shown above with regard to FIG. 4A, is here expanded by means of a circumferential extension FS. The extension FS expands the neck HA that lies between the shoulder region SB and the ball head KK in the radial direction and/or lengthens the neck HA in the longitudinal direction of the implant IM.

The ball shell KS can once again be composed of plastic, metal, veneers made of multiple plastic materials, as well as ceramic or composite materials. In particular, the extension FS can be made available in a material that is different from and essentially more elastic than the remainder of the ball head KK. In analogy to the embodiment described in FIG. 3A, the firm seat of the ball shell KS with extension FS can additionally be attached using a filler compound, aside from the purely mechanical attachment by means of the undercut.

The filler compound FM that is introduced can be made available in the form of an adhesive or a cement, for example.

Figure 6A:
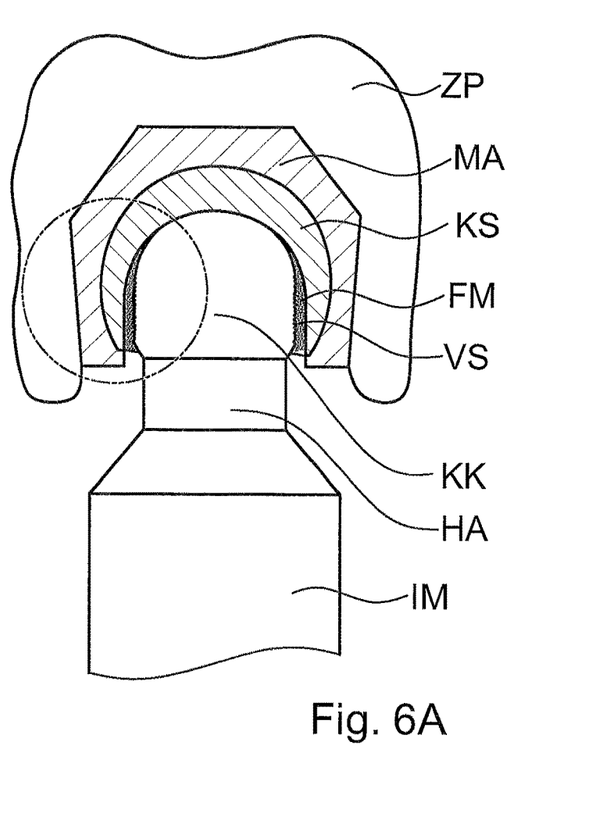
Figure 6B:
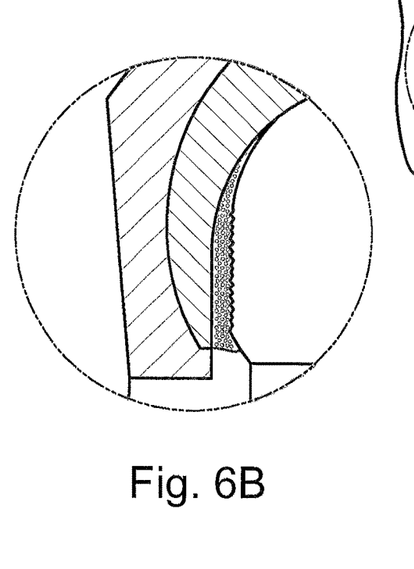

FIG. 6A shows an implant IM repaired using the ball shell KS from FIG. 3A, with a dental prosthesis ZP set on. It becomes clear that the ball shell KS that is applied for repair forms a retention element on its outside, which element stands in contact, with shape fit, with the matrix. Furthermore, the matrix MA now once again stands in contact with the implant in such a manner that the matrix MA surrounds the worn ball head KK, with the ball shell KS applied to it, on the side that faces the neck HA. It can therefore be seen that the repaired location is now suitable again for carrying the dental prosthesis ZP. It should be mentioned that the repair shown in FIG. 6A, using a shell according to FIG. 3A, can also take place for all the other repair variants according to FIG. 4A and FIG. 5 that were mentioned.

Figure 7:
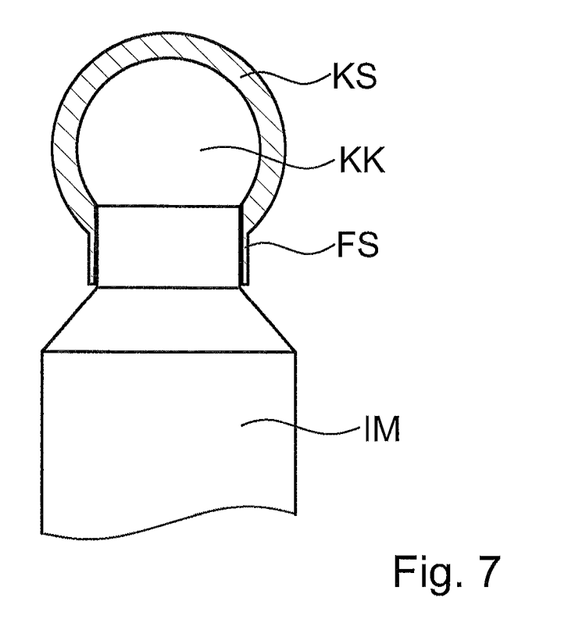

FIG. 7 shows a ball shell KS with an extension FS that was applied to a non-worn ball head KK so as to increase its outer dimensions. The ball head KK shown therefore corresponds to the ball head KK from FIG. 1A. The need to expand a non-worn ball head occurs, above all, because the ball head is allowed to have maximally the same diameter as the implant, since otherwise it would make introduction of the implant into the bone difficult. After the implant has grown firmly into the bone of the patient, however, the holding force that can be achieved with it is limited. The ball shell KS according to the invention for expansion of a non-worn ball head KK provides a remedy here. Also, expansion of the ball head diameter is necessary if the patient wishes to have a firmer or particularly firm hold of the dental implant.

The ball shell KS with extension FS shown in FIG. 7 stands as a representative for all other ball shell variants mentioned, which are also suitable for expansion of a non-worn ball head KK. Likewise, a filler compound can be used, which evens out shape-related free spaces between the ball shell KS and the ball head KK and/or guarantees a firm seat.

The term ball shell KS used in the figure description serves merely to refer to a hollow and partially open body. The body can, in fact, have a ball shape, but also other shapes, such as that of an ellipsoid, a cylinder, or of a block, for example. In this regard, the shape used can be selected in accordance with technical requirements.

Furthermore, the ball shells KS can have a coloration, in all the embodiments mentioned, which permits a conclusion regarding their dimensions. Usually, the ball heads KK are formed on implants IM in standard dimensions, wherein the balls shells KS described can be oriented on the basis of such standard dimensions with regard to their outside dimension, so that compatibility with existing systems of matrices exists.

Those types of retention elements that have an outer surface that is conical, cylindrical or shaped in some other way, and are equipped with a retentive effect are also included in the term of shell. The retentive effect can also come to bear in interaction with a silicone filler material that has an adjustable hardness. In this regard, this can involve the configuration that is usual in dental technology, with a projection or a recess, preferably running circumferentially, as they are implemented in abutments. Accordingly, by applying the shell KS, the retention element in the form of the ball head KK can also be converted to a further retention element that does not have a ball head but rather a different configuration that is usual in dental technology.

The characteristics indicated above, as well as the characteristics that can be derived from the figures, can be advantageously implemented both individually and in different combinations. The invention is not restricted to the exemplary embodiments described, but rather can be modified in many ways within the scope of the ability of a person skilled in the art.

The invention claimed is:

1. An assembly comprising:
    an anchoring element comprising a first retention element having outside dimensions and being a worn ball head located on a neck or a non-worn ball head located on a neck; and
    a shell configured for adaptation of the first retention element on the anchoring element;
    wherein the shell has a ball-shaped body and an interior cavity in the ball-shaped body and a circumferential extension, the interior cavity having cavity dimensions adapted to the outside dimensions of the first retention element, the interior cavity having an undercut that is adapted to surround a lower base of the worn ball head or the non-worn ball head and to hold the shell on the first retention element or is adapted to surround a lower base of the worn ball head or the non-worn ball head and to support retention on the first retention element, the circumferential extension surrounding the neck;
    wherein the interior cavity is connected with the first retention element with a material fit or a shape fit;
    wherein the shell has a ball-shaped outer surface configured as a second retention element which is a patrix;
    wherein an adhesive material is located between an inner surface of the interior cavity and a surface of the retention element; and
    wherein the extension is made of a material that is different from and more elastic than the ball-shaped body.

2. The assembly according to claim 1, wherein the shell comprises a material composed of one or more plastics.

3. The assembly according to claim 2, wherein the material has a coloration selected to represent a dimension of the second retention element.

4. The assembly according to claim 1, wherein the shell comprises one or more metals.

5. The assembly according to claim 1, wherein the shell is produced from a hybrid material.

6. The assembly according to claim 1, wherein the interior cavity has rotation symmetry along an axial direction.

7. The assembly according to claim 1, wherein the first retention element has reduced functionality due to wear and the interior cavity is adapted to the first retention element that has reduced functionality due to wear.

8. The assembly according to claim 7, wherein the second retention element has a diameter greater than a diameter of the first retention element.

9. The assembly according to claim 1, wherein the first retention element has a diameter and the interior cavity is adapted to the first retention element, so as to expand the diameter of the first retention element.

10. The assembly according to claim 1, wherein the interior cavity is dimensioned in such a manner that a free space for adhesive materials remains between the inner surface of the interior cavity and the surface of the retention element.

11. The assembly according to claim 10, wherein the adhesive material is an adhesive or a cement.

12. The assembly according to claim 1, wherein the first retention element is adapted to attach at or on implants or root pins.

13. A method of using a shell, comprising the steps:
selecting a shell while paying attention to outside dimensions of a first retention element;
setting the shell onto the first retention element; and
setting a dental prosthesis onto the shell;
wherein the shell is configured for adaption of the first retention element on an anchoring element, the anchoring element being a worn ball head located on a neck or a non-worn ball head located on a neck;
wherein the shell has a ball-shaped body and an interior cavity in the ball-shaped body and a circumferential extension, the interior cavity having cavity dimensions adapted to the outside dimensions of the first retention element, the interior cavity having an undercut that is adapted to surround a lower base of the worn ball head or the non-worn ball head and to hold the shell on the first retention element or is adapted to surround a lower base of the worn ball head or the non-worn ball head and to support retention on the first retention element, the circumferential extension surrounding the neck;
wherein the interior cavity is connected with the first retention element with a material fit or a shape fit;
wherein the shell has a ball-shaped outer surface configured as a second retention element which is a patrix;
wherein an adhesive material is located between an inner surface of the interior cavity and a surface of the retention element; and
wherein the extension is made of a material that is different from and more elastic than the ball-shaped body.

14. The method according to claim 13, wherein the first retention element has a functionality reduced by wear.

15. The method according to claim 13, wherein the first retention element has dimensions that are not worn away.

* * * * *